United States Patent
Royzner et al.

(10) Patent No.: US 10,452,731 B2
(45) Date of Patent: Oct. 22, 2019

(54) METHOD AND APPARATUS FOR GENERATING A RECOMMENDED SET OF ITEMS FOR A USER

(71) Applicant: YANDEX EUROPE AG, Lucerne (CH)

(72) Inventors: Mikhail Aleksandrovich Royzner, Moscow (RU); Victor Grigorievich Lamburt, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 23 days.

(21) Appl. No.: 15/262,318

(22) Filed: Sep. 12, 2016

(65) Prior Publication Data
US 2017/0091336 A1    Mar. 30, 2017

(30) Foreign Application Priority Data
Sep. 28, 2015    (RU) .................. 2015141108

(51) Int. Cl.
*G06F 16/00* (2019.01)
*G06F 16/9535* (2019.01)
*G06F 16/435* (2019.01)

(52) U.S. Cl.
CPC ........ *G06F 16/9535* (2019.01); *G06F 16/435* (2019.01)

(58) Field of Classification Search
CPC ......... G06F 17/30029; G06F 17/30867; G06F 16/435; G06F 16/9535
See application file for complete search history.

(56) References Cited

U.S. PATENT DOCUMENTS

| 7,007,242 B2 | 2/2006 | Suomela et al. |
| 7,328,216 B2 | 2/2008 | Hofmann et al. |

(Continued)

FOREIGN PATENT DOCUMENTS

| CN | 103077220 A | 5/2013 |
| CN | 103167330 A | 6/2013 |

(Continued)

OTHER PUBLICATIONS

European Search Report dated Dec. 11, 2017 with regard to the counterpart patent application EP 17 18 9557.

(Continued)

*Primary Examiner* — Dinku W Gebresenbet
(74) *Attorney, Agent, or Firm* — BCF LLP

(57) ABSTRACT

A method of generating a recommended subset of items for a user of an electronic device is disclosed. The method is executed at a server and comprises identifying a first subset of items within a set of potentially recommendable items based on item features of items within the set of potentially recommendable items. The method also comprises acquiring a request for the recommended subset of items and identifying a second subset of items within the set of potentially recommendable items based on user events associated with the user. Each item within the second subset of items is different from any item within the first subset of items. The method also comprises generating the recommended subset of items which comprises at least some items from the first subset of items and at least some items from the second subset of items.

14 Claims, 7 Drawing Sheets

(56) References Cited

U.S. PATENT DOCUMENTS

| | | | |
|---|---|---|---|
| 7,502,789 B2 | 3/2009 | Yao et al. | |
| 7,540,051 B2 | 6/2009 | Gundersen et al. | |
| D613,300 S | 4/2010 | Chaudhri | |
| 7,849,076 B2 | 12/2010 | Zheng et al. | |
| 8,010,527 B2 | 8/2011 | Denoue et al. | |
| 8,244,740 B2 | 8/2012 | Gruenhagen et al. | |
| 8,271,898 B1 | 9/2012 | Mattos et al. | |
| 8,285,602 B1 | 10/2012 | Yi et al. | |
| 8,290,818 B1 | 10/2012 | Levitan et al. | |
| 8,301,623 B2 | 10/2012 | Chakrabarti et al. | |
| 8,386,955 B1 | 2/2013 | Weber et al. | |
| 8,412,726 B2 | 4/2013 | Yan et al. | |
| 8,429,184 B2 | 4/2013 | Ismalon | |
| 8,478,664 B1 | 7/2013 | Xavier et al. | |
| 8,510,252 B1 | 8/2013 | Gargi et al. | |
| D693,833 S | 11/2013 | Inose et al. | |
| 8,600,968 B2 | 12/2013 | Holenstein et al. | |
| 8,606,792 B1 | 12/2013 | Jackson et al. | |
| 8,676,736 B2 | 3/2014 | Pilaszy et al. | |
| 8,683,374 B2 | 3/2014 | Vaughan et al. | |
| 8,712,937 B1 | 4/2014 | Bacus et al. | |
| 8,751,507 B2 | 6/2014 | Kim et al. | |
| 8,869,042 B2 | 10/2014 | Kast | |
| 8,886,797 B2 | 11/2014 | Gannu et al. | |
| 8,893,042 B2 | 11/2014 | Laurie et al. | |
| 8,893,043 B2 | 11/2014 | Dodson et al. | |
| 8,903,834 B2 | 12/2014 | Ciancutti et al. | |
| 8,910,070 B2 | 12/2014 | Goodger et al. | |
| 8,914,399 B1 | 12/2014 | Paleja et al. | |
| 8,972,865 B2 | 3/2015 | Hansen et al. | |
| 8,983,888 B2 | 3/2015 | Nice et al. | |
| 8,996,530 B2 | 3/2015 | Luvogt et al. | |
| 9,053,416 B1 | 6/2015 | De Leo et al. | |
| 9,098,248 B2 | 8/2015 | Suzuki et al. | |
| 9,122,989 B1 | 9/2015 | Morris et al. | |
| 9,348,898 B2 | 5/2016 | Nice et al. | |
| 9,405,741 B1 | 8/2016 | Schaaf et al. | |
| 9,473,803 B2 | 10/2016 | Wang | |
| 9,569,785 B2 | 2/2017 | Alon et al. | |
| 9,660,947 B1 | 5/2017 | Hart | |
| 9,785,883 B2 | 10/2017 | Luvogt et al. | |
| 9,836,533 B1 | 12/2017 | Levi et al. | |
| 9,836,765 B2 | 12/2017 | Hariri et al. | |
| 9,900,659 B1 | 2/2018 | Norum et al. | |
| 2002/0054164 A1 | 5/2002 | Uemura | |
| 2002/0198882 A1 | 12/2002 | Linden et al. | |
| 2004/0158497 A1 | 8/2004 | Brand | |
| 2004/0260621 A1 | 12/2004 | Foster et al. | |
| 2005/0076365 A1 | 4/2005 | Popov et al. | |
| 2005/0097190 A1 | 5/2005 | Abdelhak | |
| 2006/0031114 A1 | 2/2006 | Zommers | |
| 2006/0041548 A1 | 2/2006 | Parsons et al. | |
| 2006/0293065 A1 | 12/2006 | Chew et al. | |
| 2008/0222132 A1 | 9/2008 | Pan et al. | |
| 2008/0250039 A1 | 10/2008 | Franks et al. | |
| 2008/0256017 A1 | 10/2008 | Murakami | |
| 2008/0266289 A1 | 10/2008 | Park | |
| 2008/0294617 A1* | 11/2008 | Chakrabarti | G06F 17/30867 |
| 2009/0006371 A1 | 1/2009 | Denoue | |
| 2009/0006373 A1 | 1/2009 | Chakrabarti et al. | |
| 2009/0055385 A1 | 2/2009 | Jeon et al. | |
| 2009/0150935 A1 | 6/2009 | Peters et al. | |
| 2009/0163183 A1 | 6/2009 | O'Donoghue et al. | |
| 2009/0249217 A1 | 10/2009 | Narayanaswami | |
| 2009/0276368 A1 | 11/2009 | Martin et al. | |
| 2009/0327941 A1 | 12/2009 | Fong et al. | |
| 2010/0050067 A1 | 2/2010 | Curwen et al. | |
| 2010/0070454 A1 | 3/2010 | Masuda et al. | |
| 2010/0070928 A1 | 3/2010 | Goodger et al. | |
| 2010/0131844 A1 | 5/2010 | Wohlert | |
| 2010/0175018 A1 | 7/2010 | Petschnigg et al. | |
| 2010/0205542 A1 | 8/2010 | Walman | |
| 2010/0251304 A1 | 9/2010 | Donoghue et al. | |
| 2010/0312650 A1 | 12/2010 | Pinckney et al. | |
| 2010/0312724 A1 | 12/2010 | Pinckney et al. | |
| 2011/0029636 A1 | 2/2011 | Smyth et al. | |
| 2011/0035388 A1 | 2/2011 | Im et al. | |
| 2011/0047136 A1 | 2/2011 | Dehn | |
| 2011/0047491 A1 | 2/2011 | Hwang et al. | |
| 2011/0066497 A1 | 3/2011 | Gopinath et al. | |
| 2011/0072011 A1 | 3/2011 | Qiao | |
| 2011/0107223 A1 | 5/2011 | Tilton et al. | |
| 2011/0112981 A1 | 5/2011 | Park et al. | |
| 2011/0179081 A1 | 7/2011 | Ovsjanikov et al. | |
| 2011/0208732 A1 | 8/2011 | Melton et al. | |
| 2011/0213761 A1 | 9/2011 | Song et al. | |
| 2011/0246406 A1 | 10/2011 | Lahav et al. | |
| 2011/0252050 A1 | 10/2011 | Palleti et al. | |
| 2011/0258185 A1 | 10/2011 | Acharya et al. | |
| 2011/0302117 A1 | 12/2011 | Pinckney et al. | |
| 2011/0302158 A1 | 12/2011 | Sanders | |
| 2011/0320450 A1 | 12/2011 | Liu et al. | |
| 2012/0030159 A1 | 2/2012 | Pilaszy et al. | |
| 2012/0054794 A1 | 3/2012 | Kim et al. | |
| 2012/0059707 A1 | 3/2012 | Goenka et al. | |
| 2012/0143871 A1 | 6/2012 | Liebald et al. | |
| 2012/0158685 A1 | 6/2012 | White et al. | |
| 2012/0191776 A1 | 7/2012 | Ruffner et al. | |
| 2012/0209907 A1 | 8/2012 | Andrews et al. | |
| 2012/0254097 A1 | 10/2012 | Flinn et al. | |
| 2012/0304073 A1 | 11/2012 | Mandic et al. | |
| 2012/0317104 A1 | 12/2012 | Radlinski et al. | |
| 2013/0009990 A1 | 1/2013 | Hsu et al. | |
| 2013/0024471 A1 | 1/2013 | Mitrovic | |
| 2013/0031090 A1 | 1/2013 | Posse et al. | |
| 2013/0041896 A1 | 2/2013 | Ghani et al. | |
| 2013/0046772 A1 | 2/2013 | Gu et al. | |
| 2013/0047112 A1 | 2/2013 | Waeller | |
| 2013/0073988 A1 | 3/2013 | Groten et al. | |
| 2013/0111395 A1 | 5/2013 | Ying et al. | |
| 2013/0132515 A1 | 5/2013 | Mostafa et al. | |
| 2013/0158693 A1 | 6/2013 | Beckmann et al. | |
| 2013/0159243 A1 | 6/2013 | Wei et al. | |
| 2013/0194308 A1 | 8/2013 | Privault et al. | |
| 2013/0204737 A1 | 8/2013 | Agarwal et al. | |
| 2013/0227054 A1 | 8/2013 | Zhang et al. | |
| 2013/0262478 A1 | 10/2013 | Kemp et al. | |
| 2013/0290110 A1 | 10/2013 | Luvogt et al. | |
| 2013/0290905 A1 | 10/2013 | Luvogt et al. | |
| 2013/0297698 A1 | 11/2013 | Odero et al. | |
| 2013/0311408 A1 | 11/2013 | Bagga et al. | |
| 2013/0346182 A1 | 12/2013 | Cheng et al. | |
| 2013/0346234 A1* | 12/2013 | Hendrick | G06Q 30/0631 705/26.7 |
| 2014/0006399 A1 | 1/2014 | Vasudevan et al. | |
| 2014/0025532 A1* | 1/2014 | Huang | G06Q 30/0631 705/26.7 |
| 2014/0025609 A1 | 1/2014 | Coster et al. | |
| 2014/0032678 A1 | 1/2014 | Koukoumidis et al. | |
| 2014/0040776 A1 | 2/2014 | Dann et al. | |
| 2014/0074856 A1 | 3/2014 | Rao et al. | |
| 2014/0095967 A1 | 4/2014 | Cheng et al. | |
| 2014/0101142 A1 | 4/2014 | Gomez et al. | |
| 2014/0122605 A1 | 5/2014 | Merom et al. | |
| 2014/0129500 A1 | 5/2014 | Nice et al. | |
| 2014/0136528 A1 | 5/2014 | Anima et al. | |
| 2014/0137013 A1 | 5/2014 | Matas | |
| 2014/0143012 A1 | 5/2014 | Alon et al. | |
| 2014/0143738 A1 | 5/2014 | Underwood et al. | |
| 2014/0156681 A1 | 6/2014 | Lee et al. | |
| 2014/0164365 A1 | 6/2014 | Graham | |
| 2014/0172544 A1 | 6/2014 | Rabkin | |
| 2014/0172545 A1 | 6/2014 | Rabkin | |
| 2014/0181121 A1 | 6/2014 | Nice et al. | |
| 2014/0189014 A1 | 7/2014 | Dolan et al. | |
| 2014/0195890 A1 | 7/2014 | Taylor et al. | |
| 2014/0201675 A1 | 7/2014 | Joo et al. | |
| 2014/0250390 A1 | 9/2014 | Holmes et al. | |
| 2014/0278786 A1 | 9/2014 | Liu-Qiu-Yan | |
| 2014/0280080 A1 | 9/2014 | Solheim et al. | |
| 2014/0280221 A1 | 9/2014 | Chuang et al. | |
| 2014/0280565 A1 | 9/2014 | Grewal | |
| 2014/0298263 A1 | 10/2014 | Maeda et al. | |
| 2014/0316930 A1 | 10/2014 | Jain et al. | |

(56) References Cited

U.S. PATENT DOCUMENTS

| | | | |
|---|---|---|---|
| 2014/0317105 | A1 | 10/2014 | Jain et al. |
| 2014/0358916 | A1 | 12/2014 | Anand et al. |
| 2014/0359489 | A1 | 12/2014 | Zhao et al. |
| 2014/0365853 | A1 | 12/2014 | Kleinhout et al. |
| 2014/0365854 | A1 | 12/2014 | Karunamuni et al. |
| 2014/0379893 | A1 | 12/2014 | Kannan et al. |
| 2015/0006286 | A1 | 1/2015 | Liu et al. |
| 2015/0052003 | A1 | 2/2015 | Tang et al. |
| 2015/0066643 | A1 | 3/2015 | Choi et al. |
| 2015/0088921 | A1 | 3/2015 | Somaiya et al. |
| 2015/0100587 | A1 | 4/2015 | Walkingshaw et al. |
| 2015/0112801 | A1 | 4/2015 | Nice et al. |
| 2015/0120712 | A1* | 4/2015 | Yi .................... G06F 17/30053 707/723 |
| 2015/0120722 | A1 | 4/2015 | Martin et al. |
| 2015/0154197 | A1 | 6/2015 | Lightner et al. |
| 2015/0161256 | A1 | 6/2015 | Jeh |
| 2015/0161672 | A1 | 6/2015 | Jung et al. |
| 2015/0178282 | A1 | 6/2015 | Gorur et al. |
| 2015/0189070 | A1 | 7/2015 | Baker |
| 2015/0242492 | A1 | 8/2015 | Bhatt et al. |
| 2015/0269370 | A1 | 9/2015 | Phillips |
| 2015/0269488 | A1 | 9/2015 | Galai et al. |
| 2015/0278706 | A1 | 10/2015 | Shivashankar et al. |
| 2015/0312348 | A1 | 10/2015 | Lustgarten |
| 2015/0325094 | A1 | 11/2015 | Cheng et al. |
| 2015/0330805 | A1 | 11/2015 | Cho et al. |
| 2015/0331859 | A1 | 11/2015 | Raichelgauz et al. |
| 2015/0331951 | A1 | 11/2015 | Wang et al. |
| 2015/0347358 | A1 | 12/2015 | Shultz et al. |
| 2015/0370798 | A1 | 12/2015 | Ju et al. |
| 2015/0378707 | A1 | 12/2015 | Park et al. |
| 2015/0379146 | A1 | 12/2015 | Tonse et al. |
| 2016/0004394 | A1 | 1/2016 | Macadaan et al. |
| 2016/0055242 | A1 | 2/2016 | Bradic et al. |
| 2016/0063065 | A1 | 3/2016 | Khatri et al. |
| 2016/0070803 | A1 | 3/2016 | Nuckolls |
| 2016/0110363 | A1 | 4/2016 | Tkach et al. |
| 2016/0112760 | A1 | 4/2016 | Kosseifi et al. |
| 2016/0147753 | A1 | 5/2016 | Dimson et al. |
| 2016/0154887 | A1 | 6/2016 | Zhao |
| 2016/0170982 | A1 | 6/2016 | Djuric et al. |
| 2016/0196244 | A1 | 7/2016 | Greenberg et al. |
| 2016/0275804 | A1 | 9/2016 | Koppel et al. |
| 2016/0299992 | A1 | 10/2016 | Cetintas et al. |
| 2016/0328480 | A1 | 11/2016 | Owens et al. |
| 2016/0350812 | A1 | 12/2016 | Priness et al. |
| 2016/0371274 | A1 | 12/2016 | Ng et al. |
| 2017/0011112 | A1 | 1/2017 | Jing et al. |
| 2017/0017369 | A1 | 1/2017 | Kanter et al. |
| 2017/0024391 | A1 | 1/2017 | Steck |
| 2017/0024657 | A1 | 1/2017 | Sahu et al. |
| 2017/0060870 | A1 | 3/2017 | Checkley |
| 2017/0060872 | A1 | 3/2017 | Sacheti et al. |
| 2017/0061014 | A1 | 3/2017 | Heiler et al. |
| 2017/0061286 | A1 | 3/2017 | Kumar et al. |
| 2017/0068992 | A1 | 3/2017 | Chen et al. |
| 2017/0076318 | A1 | 3/2017 | Goswami et al. |
| 2017/0083965 | A1 | 3/2017 | Sun |
| 2017/0091194 | A1 | 3/2017 | Spiegel |
| 2017/0103343 | A1 | 4/2017 | Yee et al. |
| 2017/0132230 | A1 | 5/2017 | Muralidhar et al. |
| 2017/0293865 | A1 | 10/2017 | Sandler |
| 2017/0337612 | A1 | 11/2017 | Galron et al. |
| 2018/0011937 | A1 | 1/2018 | Tikhonov |
| 2018/0014038 | A1 | 1/2018 | Lamburt et al. |
| 2018/0075137 | A1 | 3/2018 | Lifar |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2419858 C2 | 5/2011 |
| RU | 2451986 C2 | 11/2011 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| WO | 2002052374 A2 | 7/2002 |
| WO | 2009087414 A1 | 7/2009 |
| WO | 2013010698 A1 | 1/2013 |
| WO | 13189738 A1 | 12/2013 |
| WO | 14141078 A1 | 9/2014 |

OTHER PUBLICATIONS

Xiao et al., "Research and Implementation of Hybrid Recommendation Algorithm Based on Collaborative Filtering and Word2Vec", 8th International Symposium on Computational Intelligence and Design, 2015, pp. 172-175.

Koren et al., "Matrix Factorization Techniques for Recommender Systems", IEEE Computer Society, Computer, vol. 42, No. 8, 2009, pp. 42-49.

Russian Search Report from Russian patent application No. 2015141108 dated Sep. 7, 2016.

European Search Report dated Sep. 14, 2017 with regard to the counterpart patent application EP 17 18 0212.

European Search Report dated Sep. 18, 2017 with regard to the counterpart patent application EP 17 18 0214.

RU Search Report (completion date: May 25, 2017) with regard to the counterpart patent application RU 2016127446.

English Abstract for RU2013101601 retrieved on Espacenet on Nov. 2, 2017.

English abstract of CN 103838842 retrieved from Espacenet on Feb. 3, 2017.

Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.

Mozilla / newnewtab, https://github.com/mozilla/newnewtab, retrieved on Nov. 11, 2016, 2 pages.

Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.

Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.

Opera Help, Speed Dial, http://help.opera.com/Windows/12.10/en/speeddial.html, retrieved on Nov. 11, 2016, 2 pages.

Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.

Russian Search Report from RU patent application No. 2015141291 dated Nov. 2, 2016.

(56) References Cited

OTHER PUBLICATIONS

Extended European Search Report from EP16190997, dated Feb. 16, 2017, Herry, Tzvetanka.
European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), CAISE, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/607,555, filed May 29, 2017.
U.S. Appl. No. 15/262,332, filed Sep. 12, 2016.
U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (in the Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (in the Notice of Allowance with regard to the counterpart U.S. Appl. No. 15/592,745 dated Oct. 11, 2018).
Office Action with regard to the counterpart U.S. Appl. No. 15/263,493 dated Nov. 29, 2018.
Office Action with regard to the counterpart U.S. Appl. No. 15/263,493 dated Sep. 20, 2018.
Office Action with regard to the counterpart U.S. Appl. No. 15/236,538 dated Sep. 28, 2018.
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
Youtube Account: RnStore, "Zmags Demo", (May 19, 2011), times stamp 1:54/3:56, 2:20/3:56, PDF Attached, URL: https://www.youtube.com/watch?v=AsBrLdoEJgA, with regard to the U.S. Appl. No. 15/263,493.
Youtube Account: iappletech128, "Close Tabs in Safari by Swiping", (Oct. 20, 2013), time stamp 0:20-0:35/1:18, PDF Attached, URL: https://www.youtube.com/watch?v=V8TTbYrFSmg, with regard to the U.S. Appl. No. 15/263,493.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg, with regard to the U.S. Appl. No. 15/263,493.
European Examination Report with regard to the counterpart patent application No. EP 16190999.9 dated Jun. 29, 2018.
Notice of Allowance with regard to the counterpart U.S. Appl. No. 15/262,332 dated Mar. 18, 2019.
English Abstract for JP2009015834 retrieved on Espacenet on Mar. 21, 2019.
Office Action with regard to the counterpart U.S. Appl. No. 15/262,332 dated Dec. 27, 2018.
English Abstract for CN103473354 retrieved on Espacenet on Jan. 4, 2019.
Office Action with regard to the counterpart U.S. Appl. No. 15/606,326 dated Dec. 19, 2018.
Office Action with regard to the counterpart U.S. Appl. No. 15/592,745 dated Mar. 8, 2019.
Office Action with regard to the counterpart U.S. Appl. No. 15/263,493 dated May 9, 2019.
Martin Beck, "Facebook Now Asks Why You're Hiding That Ad, to Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.

\* cited by examiner

METHOD AND APPARATUS FOR GENERATING A RECOMMENDED SET OF ITEMS FOR A USER

CROSS-REFERENCE

The present application claims priority to Russian Patent Application No. 2015141108, filed Sep. 28, 2015, entitled "METHOD AND APPARATUS FOR GENERATING A RECOMMENDED SET OF ITEMS FOR A USER", the entirety of all of which is incorporated herein by reference.

FIELD

The present technology relates to search engines in general and specifically to a method and apparatus for generating a recommended content list.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the tanked list of search results).

The search engines typically provide a good search tool for a search query that the user knows a priori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD recommending system, which system aggregates and recommends content from various social networks. The FLIPBOARD recommending system presents the uncovered content in a "magazine style" format, where the user can "flip" through the pages with the recommended/aggregated content. The recommending system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

In order to generate the ranked search results in a search engine system or a list of recommended resources in a typical recommending system, the respective system utilizes a machine learning algorithm to select search results and/or recommended content. There are several machine learning algorithms known in the art and utilized by search engines and/or recommendation systems. As is known, a typical machine learning algorithm is first "trained" using a training set (whether marked or unmarked) to generate a machine learning algorithm formula, which is then applied to determine at run time for generating an output based on the system inputs.

SUMMARY

Developers of the present technology have appreciated certain technical drawbacks associated with the existing recommendation systems. Some conventional recommendation systems usually require a considerate amount of time to produce relevant content recommendations. Other recommendation systems may furnish content recommendations in an acceptable amount of time but the content recommendations may not be very relevant to a particular user. It is an object of the present technology to ameliorate at least some of the inconveniences present in the prior art.

According to one aspect of the present technology, there is provided a method of generating a recommended subset of items for a user of an electronic device, wherein the method is executed at a server. The method comprises: identifying, by the server, a first subset of items within a set of potentially recommendable items based on item features of items within the set of potentially recommendable items; acquiring, by the server, a request for the recommended subset of items; identifying, by the server, a second subset of items within the set of potentially recommendable items based on user events associated with the user, wherein each item within the second subset of items is different from any item within the first subset of items; and generating, by the server, the recommended subset of items, wherein the recommended subset of items comprises at least some items from the first subset of items and at least some items from the second subset of items.

In some implementations of the method, the method further comprises ranking, by the server, the items within the recommended subset of items.

In some implementations of the method, the method further comprises sending, by the server, instructions for displaying to the user the recommended subset of items.

In some implementations of the method, the method further comprises, prior to the acquiring the request, storing, by the server, the first subset of items in a database.

In some implementations of the method, the identifying and the storing the first subset of items is executed, by the server, in an off-line mode.

In some implementations of the method, the identifying the second subset of items comprises: identifying, by the server, a user-specific interacted subset of items from the user events associated with the user, wherein the user has interacted with each item within the user-specific interacted subset of items; identifying, by the server, a potential second subset of items within the set of potentially recommendable items, wherein each item within the potential second subset of items is similar to at least one item within the user-specific interacted subset of items; and excluding, by the server, items from the potential second subset of items that are included within the first subset of items.

In some implementations of the method, the identifying the potential second subset of items comprises comparing, by the server, each item within the user-specific interacted subset of items with each item within the set of potentially recommendable items.

In some implementations of the method, the excluding the items from the potential second subset of items that are included within the first subset of items comprises comparing, by the server, each item within the potential second subset of items with each item within the first subset of items.

In some implementations of the method, the recommended subset of items comprises only a most highly ranked item.

In some implementations of the method, the recommended subset of items comprises a predetermined number of most highly ranked items.

According to another aspect of the present technology, there is provided a server comprising a processing module and a database for generating a recommended subset of items for a user of an electronic device. The server is configured to: identify a first subset of items within a set of potentially recommendable items based on item features of items within the set of potentially recommendable items; acquire a request for the recommended subset of items; identify a second subset of items within the set of potentially recommendable items based on user events associated with the user, wherein each item within the second subset of items is different from any item within the first subset of items; and generate the recommended subset of items, wherein the recommended subset of items comprises at least some items from the first subset of items and at least some items from the second subset of items.

In some implementations of the server, the server is further configured to rank the items within the recommended subset of items.

In some implementations of the server, the server is further configured to send instructions for displaying to the user the recommended subset of items.

In some implementations of the server, the server is further configured to, prior to acquire the request, store the first subset of items in the database.

In some implementations of the server, wherein the server is configured to identify and to store the first subset of items in an off-line mode.

In some implementations of the server, to identify the second subset of items the server is configured to: identify a user-specific interacted subset of items from the user events associated with the user, wherein the user has interacted with each item within the user-specific interacted subset of items; identify a potential second subset of items within the set of potentially recommendable items, wherein each item within the potential second subset of items is similar to at least one item within the user-specific interacted subset of items; and exclude items from the potential second subset of items that are included within the first subset of items.

In some implementations of the server, to identify the potential second subset of items the server is configured to compare each item within the user-specific interacted subset of items with each item within the set of potentially recommendable items.

In some implementations of the server, to exclude the items from the potential second subset of items that are included within the first subset of items the server is configured to compare each item within the potential second subset of items with each item within the first subset of items.

In some implementations of the server, the recommended subset of items comprises only a most highly ranked item.

In some implementations of the server, the recommended subset of items comprises a predetermined number of most highly ranked items.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
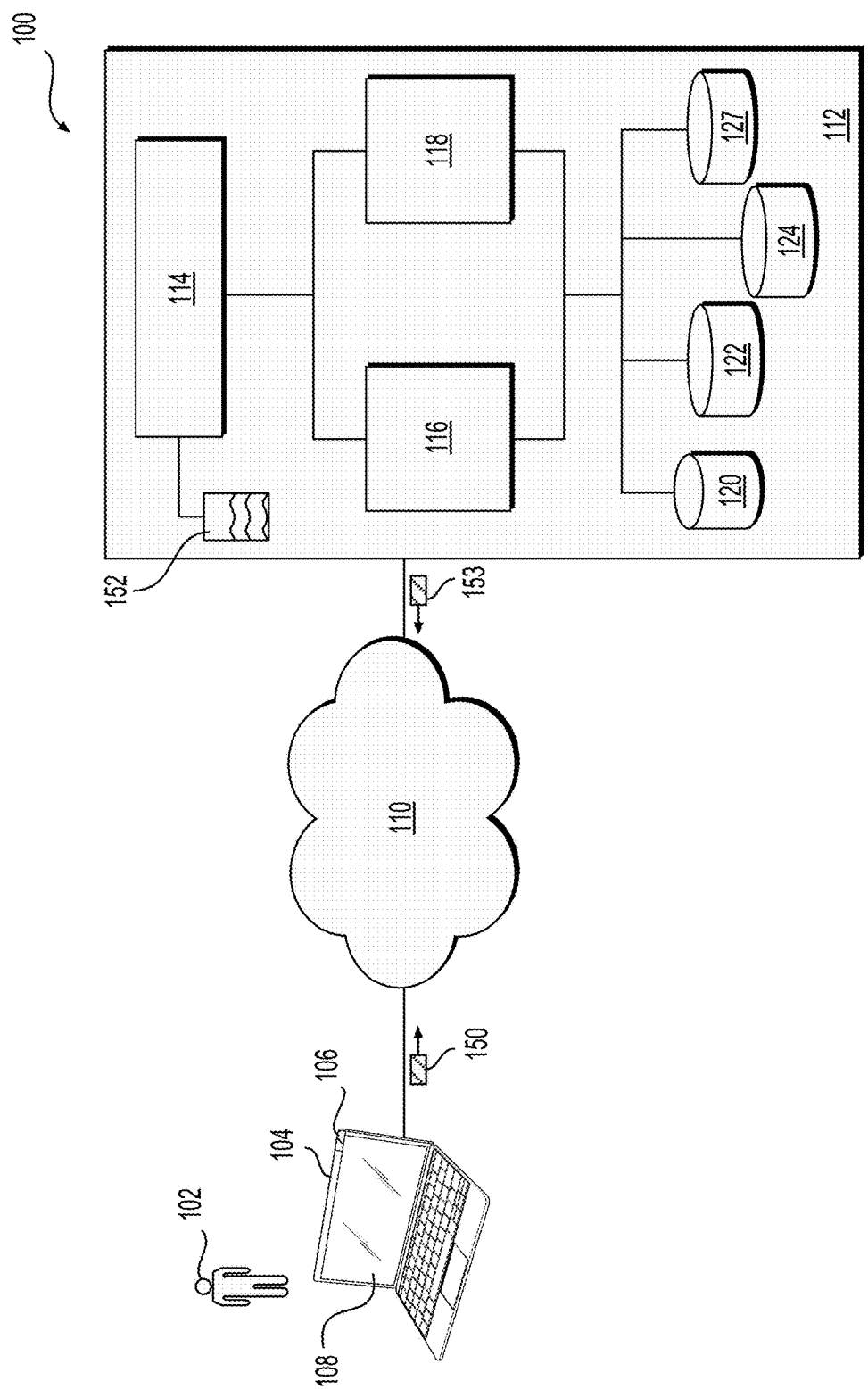
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be express or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means.

Figure 4:
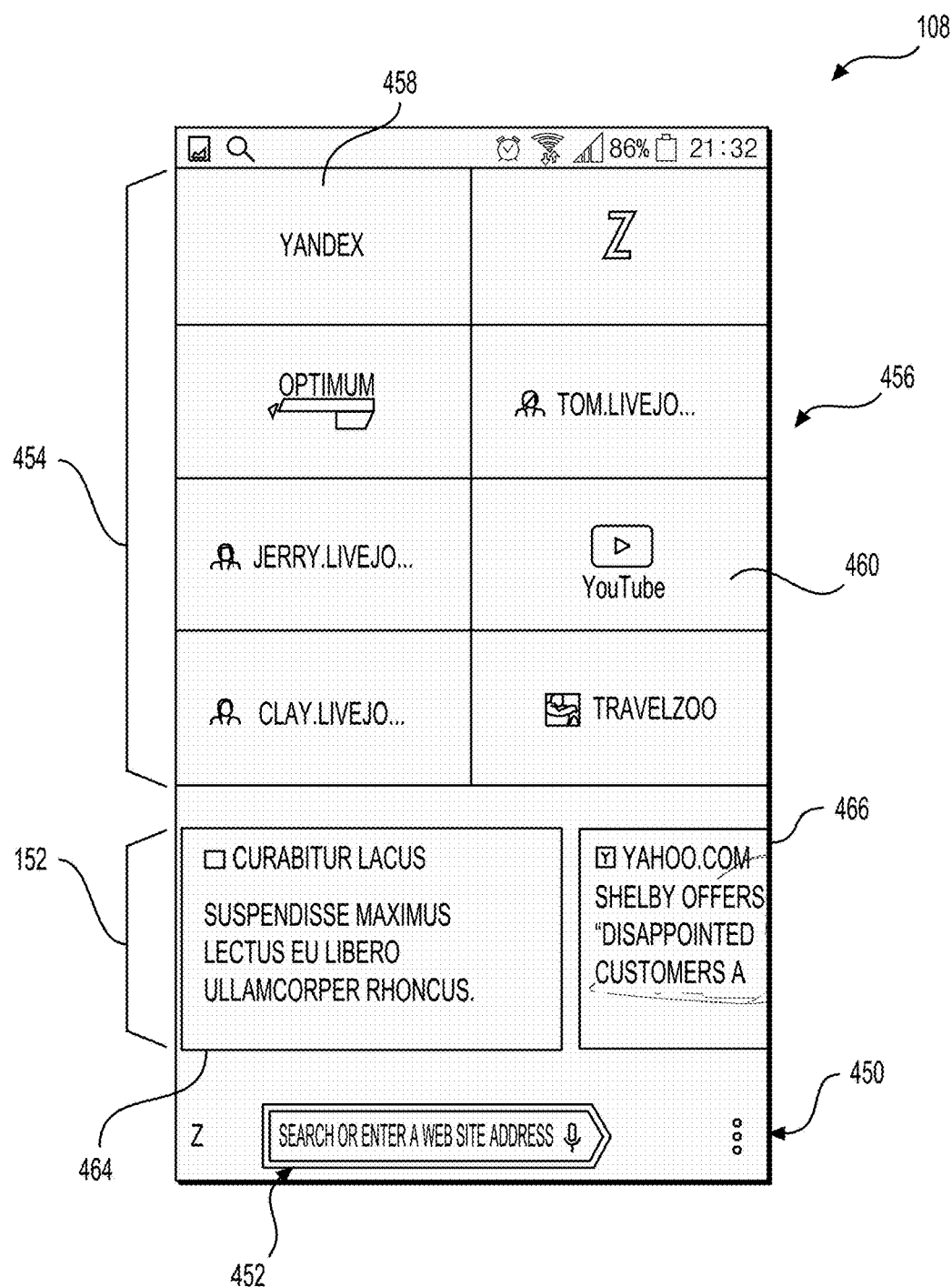
FIG. 4 depicts a screen shot of a recommendation interface implemented in accordance to one non-limiting embodiment of the present technology, the recommendation interface generated on an electronic device associated with a user of the system of FIG. 1.

Generally speaking, the recommendation application 106 comprises a recommendation interface 108, the recommendation interface 108 being displayed on a screen (not separately numbered) of the electronic device 104. With reference to FIG. 4, there is depicted a screen shot of the recommendation interface 108 implemented in accordance to one non-limiting embodiment of the present technology. In some embodiments of the present technology the recommendation interface 108 is actuated when the user 102 of the electronic device 104 actuates (i.e. executes, run, background-run or the like) the recommendation application 106. Alternatively, the recommendation interface 108 can be actuated when the user 102 opens a new browser window and/or activates a new tab in the browser application.

The recommendation interface 108 includes a search interface 450. The search interface 450 includes a search query interface 452. The search query interface 452 can be implemented as an "omnibox" which allows entry of a search query for executing a search or a network address (such as a Universal Remote Locator) for identifying a network resource (such as a web site) to be accessed.

The recommendation interface 108 further includes a links interface 454. The links interface 454 includes a plurality of actuators 456, each of the plurality of actuators 456 having a link to either (i) a web site marked as "favourite" or otherwise marked by the user 102, (ii) a previously visited web site or (iii) the like. The plurality of actuators 456, in the depicted embodiment, is visually presented to the user 102 as square buttons with a logo and/or a name of the resource depicted therein, the logo and the name for enabling the user 102 to identify which resource the particular one of the plurality of actuators 456 is linked to. However, it should be expressly understood that the visual representation of some or all of the plurality of actuators 456 can be different. As such, some or all of the plurality of actuators 456 can be implemented as differently shaped buttons, as hyperlinks presented in a list or the like.

As an example, the plurality of actuators 456 includes inter alia a first actuator 458 and a second actuator 460. The first actuator 458 can be associated with a link to Yandex™ search engine and, to that end, the first actuator 458 has the Yandex search engine logo depicted therein and may be associated with a hyperlink to www.yandex.ru, for example. The second actuator 460 can be associated with a link to Youtube™ video sharing service and, to that end, the first actuator 458 has YoutTube video sharing logo depicted therein and may be associated with a hyperlink to www.y-outube.com, for example. Needless to say, the number and content of the individual ones of the plurality of actuators 456 is not particularly limited.

The recommendation interface 108 further includes a recommended subset 152 of items. The recommended subset 152 of items includes one or more recommended items, such as a first recommended item 464 and a second recommended item 466. Naturally, the recommended subset 152 of items can have more (or fewer) than the two items (the first recommended item 464 and the second recommended item 466). Within the embodiment depicted in FIG. 4 and in those embodiments where more than one recommended item are present, the user 102 can scroll through the recommended subset 152 of items. The scrolling can be achieved by any suitable means. For example, the user 102 can scroll through the recommended items of the recommended subset 152 of items by means of actuating a mouse device (not depicted), a key board key (not depicted) or interacting with a touch sensitive screen (not depicted) of or associated with the electronic device 104. In the depicted embodiment of FIG. 4, the user 102 can scroll through the recommended items (i.e. through the first recommended content item 464 and the second recommended content item 466, as well as other recommended content items potentially present in the recommended subset 152) by executing right to left or left to right swipe (or mouse scroll or a key board scroll) action. However, it should be noted that in alternative embodiments, the scrolling through the recommended items can be done in a vertical direction or any other suitable direction.

How the content for the recommended subset 152 of items is generated will be described in greater detail herein below.

The recommendation interface 108 of FIG. 4 can be thought of as "an overview recommendation screen" in a sense that it provides an overview of recommended items alongside with other content and/or interfaces. More specifically, in the illustrated embodiment, the recommended subset 152 of items (which allows the user 102 to explore items that the user 102 may not have previously seen or that the user 102 even knows that she/he may be interested in) is presented together with the plurality of actuators 456 (which allows the user 102 to explore the items the user 102 has previously viewed and/or marked as interesting), as well as the search interface 450 (which allows the user 102 to search for resources and/or access resources, such as those resources available on the Internet and the like).

Figure 5:
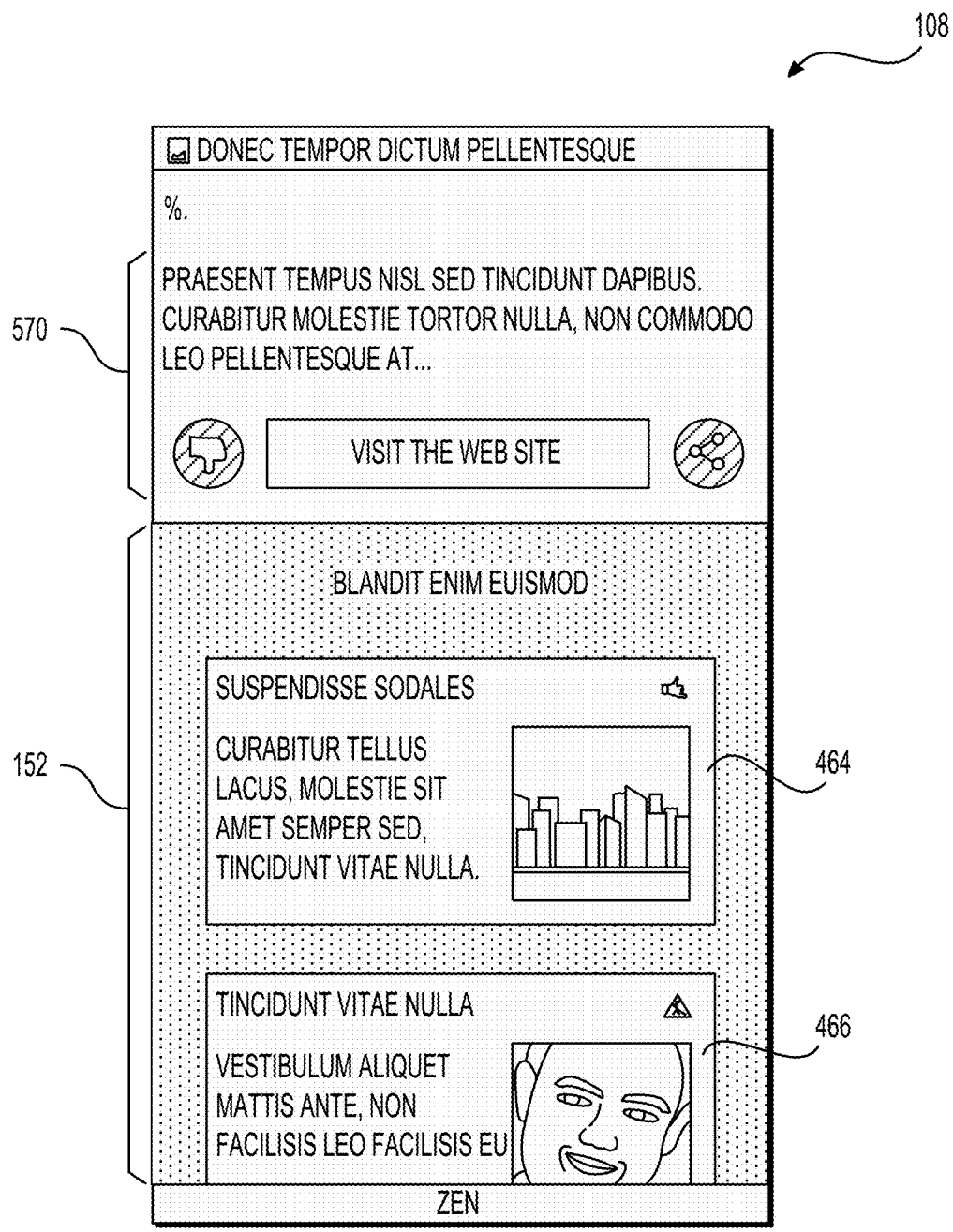
FIG. 5 depicts a screen shot of a recommendation interface implemented in accordance to other non-limiting embodiment of the present technology, the recommendation interface generated on the electronic device associated with a user of the system of FIG. 1.

With reference to FIG. 5, the recommendation interface 108 is depicted in a "recommended items" variation thereof. More specifically, the recommendation interface 108 depicted in FIG. 5 comprises the aforementioned recommended subset 152 of items that includes the first recommended item 464 and the second recommended item 466 (the content thereof being different from that depicted in FIG. 4). In addition to the recommended subset 152 of items, the recommendation interface 108 of FIG. 5 further includes a highlighted recommended item 570, which can be the most relevant/interesting recommended item for the user 102 as selected by a processing module 114 (to be described herein below).

As one will appreciate, the recommendation interface 108 of FIG. 5 does not include elements that are akin to the plurality of actuators 456 or the search interface 450. Thus, the recommended items variation of the recommendation interface 108 allows the user 102 to browse the recommended items without being "distracted" by other items (such as favourite links, search interfaces and the like).

Figure 6:
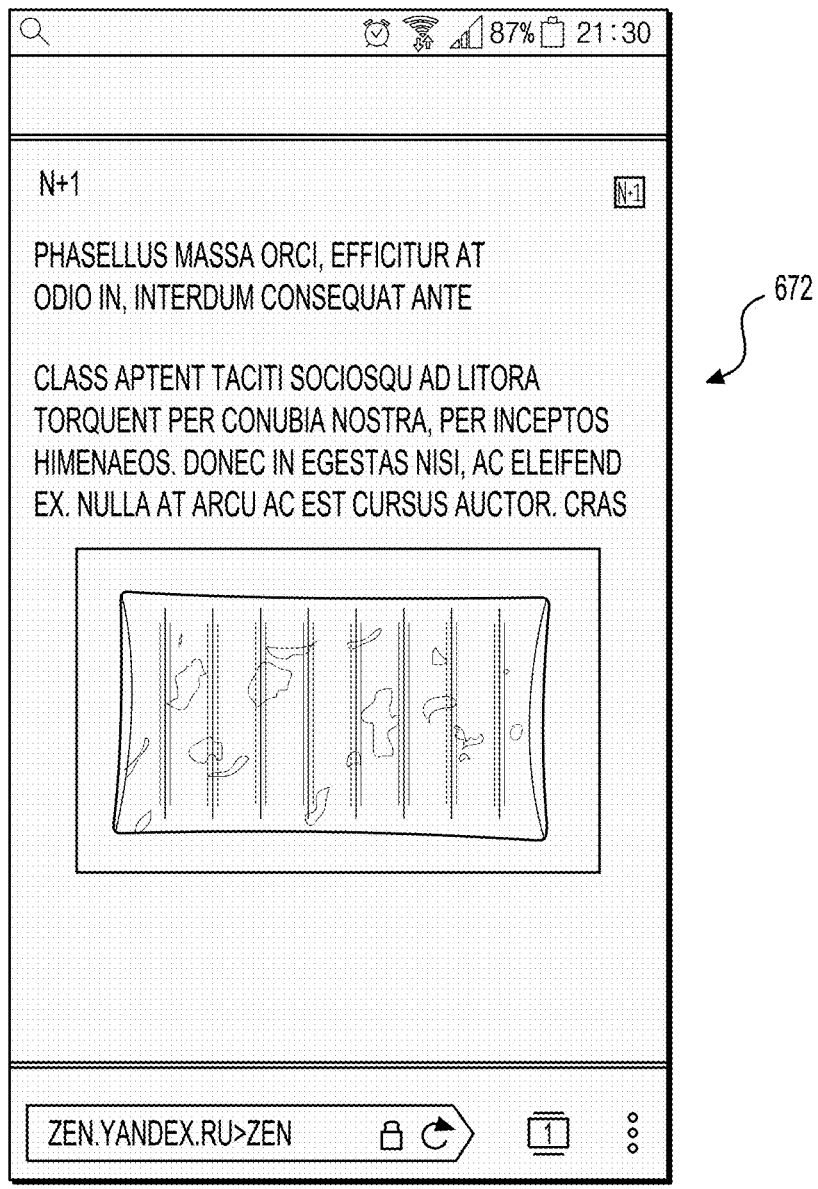
FIG. 6 depicts a screen shot of a recommendation interface implemented in accordance to yet another non-limiting embodiment of the present technology, the recommendation interface generated on the electronic device associated with a user of the system of FIG. 1.

Finally, with reference to FIG. 6, the recommendation interface 108 is depicted in a "recommended item view" configuration. Within the illustration of FIG. 6, the recommendation interface 108 displays a single recommended item 672. The recommended item view allows the user 102 to peruse individual recommended items (such as the content of the single recommended item 672 depicted in FIG. 6).

It is noted that the transition between the views of the recommendation interface 108 between that illustrated in FIG. 4, FIG. 5 and FIG. 6 may be triggered upon user 102 executing a particular action. For example after being presented with the recommendation interface 108 of FIG. 4, upon user clicking in the area generally associated with the recommended subset 152, the electronic device 104 may change presentation of the recommendation interface 108 of FIG. 4 to that of FIG. 5. By the same token, upon the user 102 clicking (or otherwise actuating) a specific one of the recommended subset 152 of items displayed within the recommendation interface 108 of FIG. 5, the electronic device 104 may change presentation of the recommendation interface 108 of FIG. 4 to that of FIG. 5.

Returning to the description of FIG. 1, the electronic device 104 is communicatively coupled to a communication network 110 for accessing a server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The server 112 can be implemented as a conventional computer server. In an example of an embodiment of the present technology, the server 112 can be implemented as a Dell™ PowerEdge™ Server running the Microsoft™ Windows Server™ operating system. Needless to say, the server 112 can be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

The server 112 comprises the processing module 114. The processing module 114 is operatively coupled to a first module 116 and a second module 118. The processing module 114 has access to a first database 120, a second database 122, a third database 124 and a fourth database 126. In the depicted embodiment, the processing module 114 has access to the first database 120, the second database 122, the third database 124 and the fourth database 126 via either one of the first module 116 and the second module 118. However, in alternative embodiments, the processing module 114 can have direct access to some or all of the first database 120, the second database 122, the third database 124 and the fourth database 126.

Furthermore, in the depicted illustration the first database 120, the second database 122, the third database 124 and the fourth database 126 are depicted as separate physical entities. This does not need to be so in each and every embodiment of the present technology. As such, some or all of the first database 120, the second database 122, the third database 124 and the fourth database 126 may be implemented in a single database. Furthermore, any one of the first database 120, the second database 122, the third database 124 and the fourth database 126 may, in itself, be split into several distributed storages.

By the same token, the processing module 114, the first module 116 and the second module 118 are depicted as separate physical entities. This does not need to be so in each and every embodiments of the present technology. As such, some or all of the processing module 114, the first module 116 and the second module 118 may be implemented in a single hardware apparatus. Furthermore, any one of the processing module 114, the first module 116 and the second module 118 may, in itself, be split into several distributed hardware apparatuses.

By the same token, all (or any combination of) the processing module 114, the first module 116, the second module 118, the first database 120, the second database 122, the third database 124 and the fourth database 126 may be implemented in a single hardware apparatus.

The functions of various components of the server 112 will be described in greater details.

The processing module 114 is configured to (i) receive from the electronic device 104 a request 150 for the recommended subset 152 of items and (ii) responsive to the request 150, to generate the recommended subset 152 of items specifically customized for the user 102 associated with the electronic device 104. The processing module 114 may further coordinate execution of various routines described herein as performed by the first module 116, the second module 118, as well as the first database 120, the second database 122, the third database 124 and the fourth database 126.

In some embodiments of the present technology, the request 150 may be generated in response to the user 102 providing an explicit indication of the user desire to receive the recommended subset 152 of items. For example, the aforementioned recommendation interface 108 can provide a button (or another actuatable element) to enable the user 102 to indicate her/his desire to receive a new or an updated recommended subset of items. As a non-limiting example, the recommendation interface 108 can provide an actuatable button that reads "Request a content recommendation". Within these embodiments, the request 150 for the recommended subset 152 of items can be thought of as "an explicit request" in a sense of the user 102 expressly providing a request for the recommended subset 152 of items.

In other embodiments, the request 150 can be generated in response to the user 102 providing an implicit indication of the user desire to receive the recommended subset 152 of items. In some embodiments of the present technology, the request 150 can be generated in response to the user 102 starting the recommendation application 106.

In yet further embodiments of the present technology, the request 150 can be generated even without the user 102 providing either explicit or implicit indication of the user desire to receive the recommended subset 152 of items. For example, in those embodiments of the present technology where the recommendation application 106 is implemented as a browser (for example, a GOOGLE™ browser, a YANDEX™ browser, a YAHOO™ browser or any other proprietary or commercially available browser application), the request 150 can be generated in response to the user 102 opening the browser application and can be generated, for example, without the user 102 executing any additional actions other than activating the browser application. As another example, the request 150 can be generated in response to the user 102 opening a new tab of the already-opened browser application and can be generated, for example, without the user 102 executing any additional actions other than activating the new browser tab. In other words, the request 150 can be generated even without the user 102 knowing that the user 102 may be interested in obtaining the recommended subset 152 of items.

As another example, the request 150 may be generated in response to the user 102 selecting a particular element of the browser application and can be generated, for example, without the user 102 executing any additional actions other than selecting/activating the particular element of the browser application.

Examples of the particular element of the browser application include but are not limited to:
An address line of the browser application bar
A search bar of the browser application and/or a search bar of a search engine web site accessed in the browser application
An omnibox (combined address and search bar of the browser application)
A favourites or recently visited network resources pane
Any other pre-determined area of the browser application interface or a web resource displayed in the browser application The first database 120 is configured to store module information. The module information may comprise information stored thereon by the processing module 114, the first module 116 and the second module 118.

The second database 122 is configured to store information related to item features associated with, for example, items with which at least one user has interacted. Examples of such items can include but are not limited to: a web site, a song to be streamed or downloaded from a network resource, a document downloaded from a network resource, a Search Engine Result Page (SERP) and the like.

Examples of the item features include but are not limited to:
Popularity of a given item (for example, in case of the given item being a music track, how many times this given music track was listened to/downloaded by all users)
A number of likes/purchases/downloads/clicks amongst all events associated with the given item
Item-inherent characteristics—in case of the given item being a music track—length of the track, the genre of the track, audio-characteristic of the track (for example, tempo of the track); other item-inherent characteristics include: the price of the given item, the dimensions of the given item, the category of the given item, the producer/maker of the item, the length of the document measured in words or symbols; category/theme of the document; movie rating on a movie rating host, etc.

Figure 2:
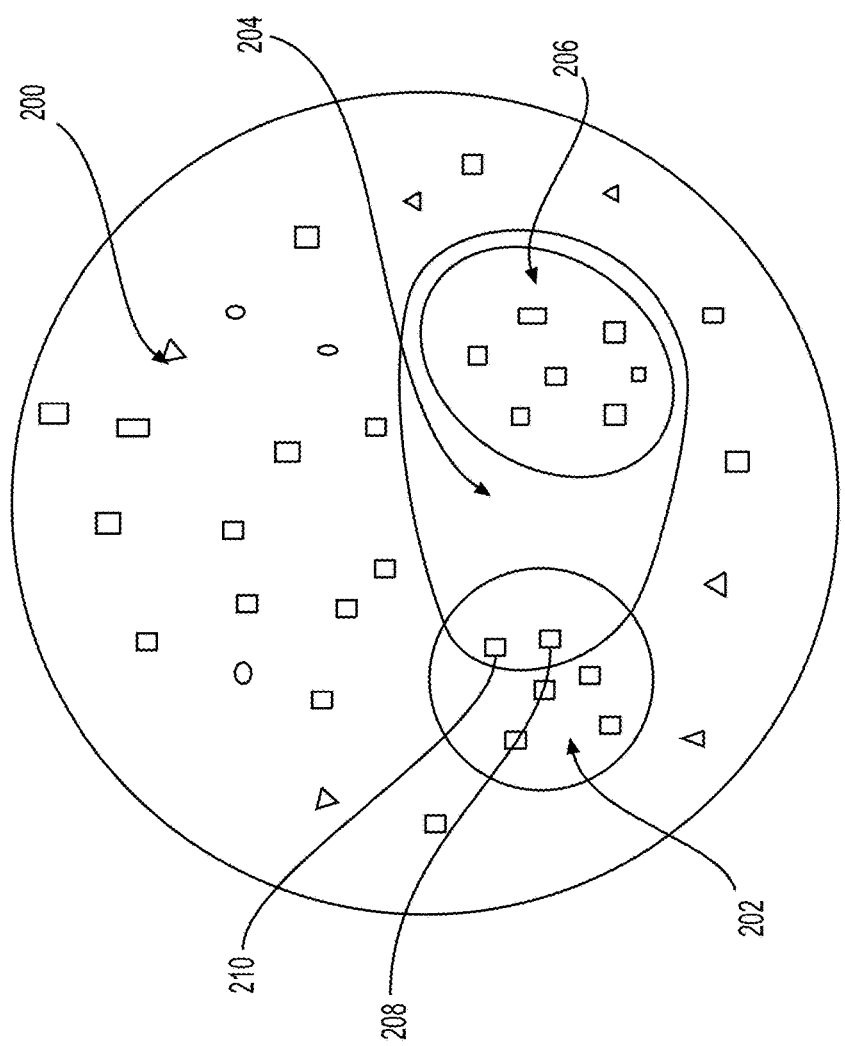
FIG. 2 is graphical illustration of a relationship between a set of potentially recommendable items, a first subset of items, a potential second subset of items and a second subset of items as contemplated in some embodiment of the present technology.

The third database 124 is configured to store information related to a set 200 of potentially recommendable items, depicted in FIG. 2. In some embodiments, the set 200 of potentially recommendable items may comprise the items with the associated item features within the second database 122. The nature of one or more potentially recommendable items within the set 200 of potentially recommendable items is not particularly limited. Some examples of the one or more potentially recommendable items include but are not limited to:
A news item
A publication
A web resource
A post on a social media web site
A new item to be downloaded from an application store
A new song (music track) to play/download on a content hosting resource
A new movie (video clip) to play/download on a content hosting resource
A new document uploaded for viewing on a social media web site (such as a new photo uploaded to an INSTRAGRAM or FACEBOOK account)

The fourth database 126 is configured to store information related to user events (associated with the user 102, as well as other users potentially present in the system 100). Naturally, the user events can be stored in an encrypted form. Examples of the user events include but are not limited to:
User 102 listening to a particular music track
User 102 "liking" the particular music track, an album associate with the particular music track and/or an artist performing the particular music track
User 102 was presented with a particular resource
User 102 has clicked on (or otherwise selected) the particular resource
User 102 has purchased/ordered/downloaded a particular item from a web resource It should be expressly understood that the user events and the item features may take many forms and are not specifically limited. As such, above presented lists of non-limiting examples of the way that the user events and the item features may be implemented are just examples thereof. As such, it should be expressly understood that many other alternative implementations of the user events and the item features may be contemplated in different implementations of the present technology.

How information is obtained and stored in the first database 120, the second database 122, the third database 124 and the fourth database 126 is not particular limited. Some example implementations will be outlined herein below.

For example, the information related to the item features may be obtained from a particular service that maintains information about various items available therefrom and the like; and stored in the second database 122. The information related to the item features may be divided into various categories representative of various types of items.

For example, the information related to the set of potentially recommendable items can be obtained from the particular service that maintains a list of existing and/or newly available items (for example, on-line media streaming resources, on-line media downloading resources, etc), from social media networks that the user 102 (and other users) subscribe to, news resources and the like; and stored in the third database 124.

For example, the information related to the user events may be obtained from the particular service that maintains information about various items available therefrom and user interactions with the various items, user search logs, user logs associated with user interactions with the particular service, user browser logs and the like; and stored in the fourth database 126. The information related to the user events may be stored in an encrypted form.

In some embodiments of the present technology, the processing module 114, the first module 116 and the second module 118 may be configured to perform various routines described herein below for executing different functionalities of the present technology.

In some embodiments, with reference to FIG. 2, the first module 116 may be configured to identify a first subset 202 of items within the set 200 of potentially recommendable items. To this end, the first module 116 may be configured to retrieve from the third database 124 the set 200 of potentially recommendable items. The first module 116 may also be configured to retrieve from the second database 122 the item features associated with the items within the set 200 of potentially recommendable items. The first module 116 may also be configured to rank the items within the set 200 of potentially recommendable items based on their respective item features.

For example, the first module 116 may rank the items within the set 200 of potentially recommendable items by their respective popularity, number of likes, number of downloads, price and the like. Further, the first module 116 may be configured to identify the first subset 202 of items as most highly ranked items within the set 200 of potentially recommendable items. For instance, the first module 116 may identify the first subset 202 of items as 100 most highly ranked items within the set 200 of potentially recommendable items. It should be noted that a number of the most highly ranked items within the set 200 of potentially recommendable items that may be identified as the first subset 202 of items by the first module 116 is not a limiting aspect of the present technology.

In other embodiments, the first module 116 may store the first subset 202 of items within the first database 120. In other words, the first module 116 may store the items within the first subset 202 of items within the first database 120 as part of the module information.

In alternative embodiments, the first module 116 may identify and store of the first subset 202 of items in an off-line mode. In other words, the first module 116 may identify and store of the first subset 202 of items prior to the electronic device 104 sending the request 150. In some implementations of the present technology, identifying and storing the first subset 202 of items in the off-line mode allows decreasing an amount of time required for the server 112 to respond to the request 150 (i.e. during the "run time" or, in other words, the use of the present technology).

In some embodiments, the second module 118 may retrieve from the fourth database 126 the user events associated with the user 102. As mentioned above, the user events associated with the user 102 may comprise the user events related to the items with which specifically the user 102 has interacted. Therefore, the second module 118 may identify a user-specific interacted subset of items, wherein specifically the user 102 has interacted with each item within the user-specific interacted subset of items, from the user events associated with the user 102. In additional embodiments, the set 200 of potentially recommendable items may comprise the items within the user-specific interacted subset of items.

The second module 118 may be configured to identify a potential second subset 204 of items within the set 200 of potentially recommendable items. In other words, the second module 118 may identify the potential second subset 204 of items within the set 200 of potentially recommendable items based on the user-specific interacted subset of items. In some embodiments, the second module 118 may retrieve the set 200 of potentially recommendable items from the third database 124, the item features associated with the items within the set 200 of potentially recommendable items and the item features associated with the items within the user-specific interacted subset of items from the second database 122. As a result, the second module 118 may be configured to compare each item within the user-specific interacted subset of items with each item within the set 200 of potentially recommendable items based on the item features associated with each respective item within the user-specific interacted subset of items and the set 200 of potentially recommendable items. The second module 118 may be configured to compare each item within the user-specific interacted subset of items with each item within the set 200 of potentially recommendable items to determine which items within the set 200 of potentially recommendable items are similar to at least one item within the user-specific interacted subset of items.

The second module 118 may determine that two items are similar based on their respective item features. For example, the second module 118 may determine that the two items are similar if they have at least some similar or analogous item-inherent characteristics. Let's say that a specific item within the user-specific interacted subset of items is a music track associated with the item-inherent characteristics of: Title "Lose yourself", Artist "Eminem", Album "8 mile", Year "2002", etc. In this case, the second module 118 may determine that a particular item within the set 200 of recommendable items is similar to the specific item within the user-specific interacted subset of items if, for example, the particular item is another music track associated with the item-inherent characteristics of: Title "Run Rabbit Run", Artist "Eminem", Album "8 mile", Year "2002".

Figure 3:
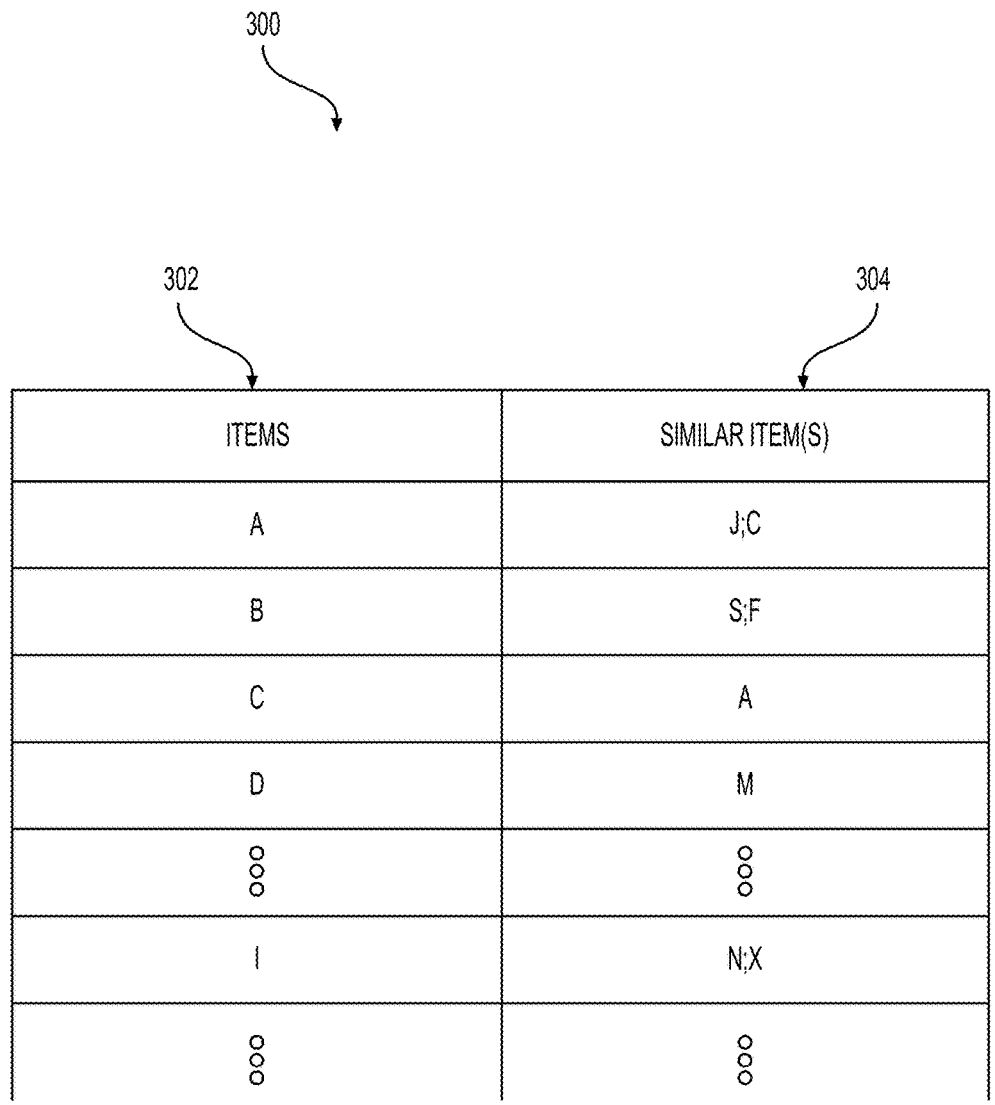
FIG. 3 illustrates a comparison table, which is stored in a database, for identifying items within the set of potentially recommendable items that are similar to items within an interacted subset of items as contemplated in some implementations of the present technology.

In another embodiment, the second module 118 may determine that the two items are similar based on a comparison table 300 depicted in FIG. 3. The comparison table 300 may be created based on the item features of each item in the set 200 of recommendable items. For example, the comparison table 300 may be created using a machine learned algorithm, a human assessor or any other suitable technique. The comparison table 300 may have been stored in the first database 120 prior to the server 112 receiving the request 150. The comparison table 300 may comprise an item column 302 and a similar items column 304. In other words, each item in the item column 302 may be associated with at least one similar item for the similar items column 304. For example, item A is associated with similar items J and C since items' J and C item-inherent characteristics are similar or analogous to item's A item-inherent characteristics.

In further embodiments, the comparison table 300 may be created based on item features other than the item-inherent characteristics. For example, each item in the item column 302 may be associated with at least one similar item within the similar items column 304 based on similar or analogous general popularities, number of likes, downloads, purchases and the like.

Therefore, with reference to FIG. 2, the second module 118 may identify the potential second subset 204 of items within the set 200 of potentially recommendable items by identifying the items within the set 200 of potentially recommendable items that are associated with the item features being similar to the item features of at least one item within the user-specific interacted subset of items. In other words, the potential second subset 204 of items within the set 200 of potentially recommendable items may comprise the items that are similar to the at least one item within the user-specific interacted subset of items.

In some embodiments, the processing module 114 may be configured to identify a second subset 206 of items within the potential second subset 204 of items. To this end, the processing module 114 may be configured to retrieve the first subset 202 of items and the potential second subset 204 of items from the first module 116 and the second module 118, respectively. The processing module 114 may identify the second subset 206 of items within the potential second subset 204 of items by excluding the items from the potential second subset 204 of items that are included within the first subset 202 of items.

In some implementations of the present technology, identifying the second subset 206 of items may enable the server 112 to include items that may be relevant to the user 102 within the recommended subset 152 of items.

For example, the processing module 114 may compare each item within the potential second subset 204 of items with each item within the first subset 202 of items. The processing module 114 may determine that an item 208 and an item 210 are included in the first subset 202 of items and the potential second subset 204 of items. In this case, the processing module 114 may identify the second subset 206 of items by excluding the item 208 and 210 from the potential second subset 204 of items.

In alternative embodiments, the processing module may rank the items within the second subset 206 of items based on their respective item features. Based on the ranked items within the second subset 206 of items, the processing module 114 may further exclude low-ranked items from the ranked second subset 206 of items.

In some embodiments, the processing module 114 may be configured to generate the recommended subset 152 of items. To that end, the processing module 114 may be configured to merge the first subset 202 of items and the second subset 206 of items. Therefore, the recommended subset 152 of items may comprise at least some items from the first subset 202 of items and at least some items from the second subset 206 of items.

In other embodiments, the processing module 114 may be configured to rank the items within the recommended subset 152 of items. To that end, the processing module 114 may retrieve from the second database 122 the item features associated with the items within the recommended subset 152 of items. The processing module 114 may rank the items within the recommended subset 152 of items based on the item features associated with the respective items within the recommended subset 152 of items. For example, with reference to FIG. 5, the highlighted recommended item 570 may be the most highly ranked item within the recommended subset 152 of items. In additional embodiments, the processing module 114 may further exclude low-ranked items from the recommended subset 152 of items having been ranked.

In some embodiments, the processing module 114 may be configured to select the most highly ranked item within the recommended subset 152 of items as the recommended subset 152 of items. In other words, the processing module 114 may exclude all the items from the recommended subset 152 of items except the most highly ranked item. The processing module 114 may be configured to generate the recommended subset 152 of items that comprises the most highly ranked item amongst the first subset 202 of items and the potential second subset 204 of items. Therefore, the recommended subset 152 of items may comprise only the most highly ranked item.

In another embodiment, the processing module 114 may limit the recommended subset 152 of items to a certain pre-determined number of most highly ranked items, such as for example 20 (twenty) most highly ranked items within the recommended subset 152 of items or any other suitable number. In other words, the processing module 114 may exclude all the items from the recommended subset 152 of items except the 20 most highly ranked items (or any other suitable number of most highly ranked items). Therefore, the recommended subset 152 of items may comprise only a predetermined number of highly ranked items. The predetermined number may be predetermined by the human assessor, for example. Alternatively, the predetermined number can be selected by analyzing specific user past interactions with the recommendation system.

In further embodiments, the processing module 114 may send a data packet 153 to the electronic device 104 comprising instructions for displaying to the user 102 the recommended subset 152 of items.

Figure 7:
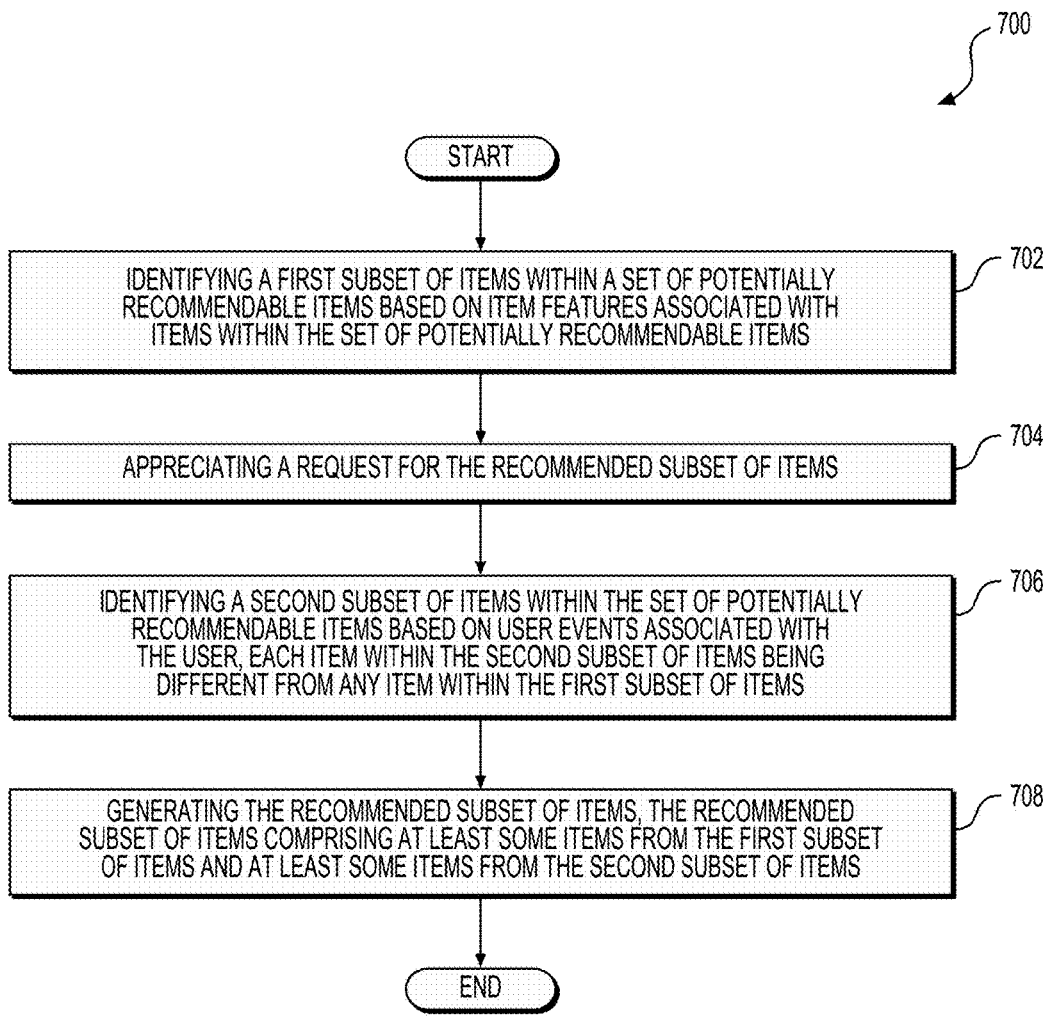
FIG. 7 depicts a block diagram of a method, the method being executable within the system of FIG. 1 and being implemented in accordance with non-limiting embodiments of the present technology.

With reference to FIG. 7, there is depicted a flowchart of a method 700 for generating the recommended subset 152 of items for the user 102 of the electronic device 104. The method 700 will be further described below.

STEP 702: Identifying the first subset of items

The method 700 begins at step 702 with the server 112 identifying the first subset 202 of items within the set 200 of potentially recommendable items based on the item features associated with the items within the set 200 of potentially recommendable items.

In some embodiments, the first module 116 may rank the items within the set 200 of potentially recommendable items based on the item features associated with each item within the set 200 of potentially recommendable items. For example, the items within the set 200 of potentially recommendable items may be ranked by their respective general popularity, number of likes, number of downloads, price and the like. As a result, the first module 116 may identify the first subset 202 of items as the most highly ranked items within the set 200 of potentially recommendable items. For example, the first module 116 may identify the 100 most highly ranked items within the set 200 of potentially recommendable items as the items of the first subset 202 of items.

In other embodiments, the first module 116 may store the first subset 202 of items within the first database 120.

In alternative embodiments, the first module 116 may identify and store the first subset of items in an off-line mode. In other words, the first module 116 may identify and store of the first subset 202 of items prior to the request 150 being sent by the electronic device 104.

STEP 704: Acquiring the request for the recommended subset of items

The method 700 continues to step 704 with the server 112 acquiring the request 150 for the recommended subset 152 of items.

In some embodiments, the request 150 may be generated in response to the user 102 providing the explicit indication of the user desire to receive the recommended subset 152 of items. In other embodiments, the request 150 may be generated in response to the user 102 providing the implicit indication of the user desire to receive the recommended subset 152 of items.

In further embodiments, the request 150 may be generated even without the user 102 providing either the explicit or the implicit indication of the user desire to receive the recommended subset 152 of items. For example, the request 150 may be generated in response to the user 102 opening the recommendation application 106.

In alternative embodiments, the request 150 may be generated in response to the user 102 selecting the particular element of the browser application and may be generated, for example, without the user 102 executing any additional actions other than selecting/activating the particular element of the browser application.

STEP 706: Identifying the second subset of items

The method 700 continues to step 706 with the server 112 identifying the second subset 206 of items within the set 200 of potentially recommendable items based on the user events associated with the user 102, wherein each item within the second subset 206 of items being different from any item within the first subset 202 of items.

In some embodiments, the identifying the second subset 206 of items may comprise identifying, by the server 112, the user-specific interacted subset of items from the user events associated with the user 102, wherein specifically the user 102 has interacted with each item within the user-specific interacted subset of items.

In other embodiments, the identifying the second subset 206 of items may comprise identifying the potential second subset 204 of items within the set 200 of potentially recommendable items, wherein each item within the potential second subset 204 of items is similar to the at least one item within the user-specific interacted subset of items. To that end, the server 112 may compare each item within the user-specific interacted subset of items with each item within the set 200 of potentially recommendable items.

In alternative embodiments, the identifying the second subset 206 of items may comprise excluding, by the server 112, the items from the potential second subset 204 of items that are included within the first subset 202 of items. To that end, the server 112 may compare each item within the potential second subset 204 of items with each item within the first subset 202 of items.

STEP 708: Generating the recommended subset of items

The method 700 end at step 708 with the server 112 generating the recommended subset 152 of items, wherein the recommended subset 152 of items comprises the at least some items from the first subset 202 of items and the at least some items from the second subset 206 of items.

In some embodiments, the server 112 may rank the items within the recommended subset 152 of items. For example, the processing module 114 may rank the items within the recommended subset 152 of items based on their respective item features.

In some embodiments, the server 112 may send the instructions for displaying to the user 102 the recommended subset 152 of items. For example the processing module 114 may generate and send to the electronic device 104 the data packet 153 comprising the instructions for displaying to the user 102 the recommended subset 152 of items.

The method 700 ends at step 708.

In some embodiments of the present technology, the server 112 executing the method 700 may reduce an amount of time required for furnishing the instructions for displaying to the user 102 the recommended subset 152 of items. In other words, execution of the method 700 by the server 112 may reduce the amount of time between the appreciation of the request 150 by the server 112 and the generation of the data packet 153 comprising the instructions for displaying to the user 102 the recommended subset 152 of items. For instance, identifying and storing the first subset 202 of items in the off-line mode may allow the server 112 to reduce the amount of time required for furnishing the instructions to the electronic device 104 for displaying to the user 102 the recommended subset 152 of items.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (700) of generating a recommended subset (152) of items for a user (102) of an electronic device (104), the method (700) being executed at a server (112), the method (700) comprises:

identifying (702), by the server (112), a first subset (202) of items within a set (200) of potentially recommendable items based on item features of items within the set (200) of potentially recommendable items;

acquiring (704), by the server (112), a request (150) for the recommended subset (152) of items;

identifying (706), by the server (112), a second subset (206) of items within the set (200) of potentially recommendable items based on user events associated with the user (102), each item within the second subset (206) of items being different from any item within the first subset (202) of items; and generating (708), by the server (112), the recommended subset (152) of items, the recommended subset (152) of items comprising at least some items from the first subset (202) of items and at least some items from the second subset (206) of items.

CLAUSE 2. The method (700) of clause 1, the method (700) further comprises ranking, by the server (112), the items within the recommended subset (152) of items.

CLAUSE 3. The method (700) of clause 1, the method (700) further comprises sending, by the server (112), instructions for displaying to the user (102) the recommended subset (152) of items.

CLAUSE 4. The method (700) of clause 1, the method (700) further comprises, prior to the acquiring (704) the request, storing, by the server (112), the first subset (202) of items in a database (120).

CLAUSE 5. The method (700) of clause 4, wherein the identifying (702) and the storing the first subset (202) of items are executed in an off-line mode.

CLAUSE 6. The method (700) of clause 1, the identifying (706) the second subset (206) of items comprises:
  identifying, by the server (112), a user-specific interacted subset of items from the user events associated with the user (102), the user (102) having interacted with each item within the user-specific interacted subset of items;
  identifying, by the server (112), a potential second subset (204) of items within the set (200) of potentially recommendable items, each item within the potential second subset (204) of items being similar to at least one item within the user-specific interacted subset of items; and
  excluding, by the server (112), items (208, 210) from the potential second subset (204) of items that are included within the first subset (202) of items.

CLAUSE 7. The method (700) of clause 6, the identifying the potential second subset (204) of items comprises comparing, by the server (112), each item within the user-specific interacted subset of items with each item within the set (200) of potentially recommendable items.

CLAUSE 8. The method of clause 6, the excluding the items from the potential second subset (204) of items that are included within the first subset (202) of items comprises comparing, by the server (112), each item within the potential second subset (204) of items with each item within the first subset (202) of items.

CLAUSE 9. The method (700) of clause 2, wherein the recommended subset (152) of items comprises only a most highly ranked item (570).

CLAUSE 10. The method (700) of clause 2, wherein the recommended subset (152) of items comprises a predetermined number of most highly ranked items.

CLAUSE 11. A server (112) comprising a processing module (114) and a database (120) for generating a recommended subset (152) of items for a user (102) of an electronic device (104), the server (112) being configured to execute the method steps within clauses 1 to 10.

What is claimed is:

1. A method of generating a recommended subset of items for a user of an electronic device, the method being executed at a server, the method comprises:
  identifying, by the server, prior to acquiring a request for the recommended subset of items, a first subset of items within a set of potentially recommendable items based on item features of items within the set of potentially recommendable items, the item features being stored in association with the respective items, the identifying being executed, by the server, in an off-line mode, the identifying comprising:
    ranking, by the server, the items within the set of potentially recommendable items based on at least one of respective item features associated with a respective item;
    the ranking being done based on past interactions of a plurality of users with the items within the set of potentially recommendable items;
    the ranking being done without knowledge of a specific user for whom the first subset of items is to be used;
  storing, by the server, prior to acquiring the request for the recommended subset of items the first subset of items in a database, the storing being executed, by the server, in the off-line mode;
  acquiring, by the server, the request for the recommended subset of items from the electronic device;
  identifying, by the server, a second subset of items within the set of potentially recommendable items based on user events associated with the user, the identifying the second subset of items comprising:
    identifying, by the server, a user-specific interacted subset of items from the user events associated with the user, the user having interacted with each item within the user-specific interacted subset of items;
    identifying, by the server, a potential second subset of items within the set of potentially recommendable items, each item within the potential second subset of items being similar to at least one item within the user-specific interacted subset of items;
    excluding, by the server, items from the potential second subset of items that are included within the first subset of items;
  the second subset of items comprising at least some items from the potential second subset of items;
  generating, by the server, the recommended subset of items by combining at least some items from the first subset of items and at least some items from the second subset of items; and
  sending, by the server, instructions for displaying to the user the recommended subset of items.

2. The method of claim 1, the method further comprises ranking, by the server, the items within the recommended subset of items.

3. The method of claim 1, wherein each item within the second subset of items is different from any item within the first subset of items.

4. The method of claim 1, the identifying the potential second subset of items comprises comparing, by the server, each item within the user-specific interacted subset of items with each item within the set of potentially recommendable items.

5. The method of claim 1, the excluding the items from the potential second subset of items that are included within the first subset of items comprises comparing, by the server, each item within the potential second subset of items with each item within the first subset of items.

6. The method of claim 2, wherein the recommended subset of items comprises only a most highly ranked item.

7. The method of claim 2, wherein the recommended subset of items comprises a predetermined number of most highly ranked items.

8. A computer server comprising a non-transitory computer usable information storage medium storing computer-readable instructions and a database, the computer server for generating a recommended subset of items for a user of an electronic device, the computer server, upon executing the computer-readable instructions, being configured to:

identify, prior to acquiring a request for the recommended subset of items, a first subset of items within a set of potentially recommendable items based on item features of items within the set of potentially recommendable items, the item features being stored in association with the respective items, the server being configured to identify the first subset of items in an off-line mode, to identify comprising the server being configured to:
 rank the items within the set of potentially recommendable items based on at least one of respective item features associated with a respective item;
 the ranking being done based on past interactions of a plurality of users with the items within the set of potentially recommendable items;
 the ranking being done without knowledge of a specific user for whom the first subset of items is to be used;
store, prior to acquiring the request for the recommended subset of items, the first subset of items in the database, the server being configured to store the first subset of items in the off-line mode;
acquire the request for the recommended subset of items from the electronic device;
identify a second subset of items within the set of potentially recommendable items based on user events associated with the user, the server configured to identify the second subset of items being configured to:
 identify a user-specific interacted subset of items from the user events associated with the user, the user having interacted with each item within the user-specific interacted subset of items;
 identify a potential second subset of items within the set of potentially recommendable items, each item within the potential second subset of items being similar to at least one item within the user-specific interacted subset of items;
 exclude items from the potential second subset of items that are included within the first subset of items;
 the second subset of items comprising at least some items from the potential second subset of items;
generate the recommended subset of items by combining at least some items from the first subset of items and at least some items from the second subset of items; and
send instructions for displaying to the user the recommended subset of items.

9. The server of claim 8, the server being further configured to rank the items within the recommended subset of items.

10. The server of claim 8, wherein each item within the second subset of items is different from any item within the first subset of items.

11. The server of claim 8, to identify the potential second subset of items the server is configured to compare each item within the user-specific interacted subset of items with each item within the set of potentially recommendable items.

12. The server of claim 8, to exclude the items from the potential second subset of items that are included within the first subset of items the server is configured to compare each item within the potential second subset of items with each item within the first subset of items.

13. The server of claim 9, wherein the recommended subset of items comprises only a most highly ranked item.

14. The server of claim 9, wherein the recommended subset of items comprises a predetermined number of most highly ranked items.

* * * * *